US006676352B2

(12) United States Patent
Chen-Chi et al.

(10) Patent No.: US 6,676,352 B2
(45) Date of Patent: Jan. 13, 2004

(54) FASTENERS WITH IMPROVED RETAINING EFFECT

(76) Inventors: Ju-Ching Chen-Chi, No. 39, Lane 559, Section 2, Chin Mar Road, Chang Hua (TW); Li-Hsin Yeh, No. 97-1, Ho Ping Road, Ta Ya Hsiang, Taichung Hsien (TW)

(*) Notice: Subject to any disclaimer, the term of this patent is extended or adjusted under 35 U.S.C. 154(b) by 227 days.

(21) Appl. No.: 09/803,960

(22) Filed: Mar. 13, 2001

(65) Prior Publication Data

US 2002/0131843 A1 Sep. 19, 2002

(51) Int. Cl.[7] .............................. F16B 35/04; F16B 37/04
(52) U.S. Cl. ........................ 411/417; 411/178; 411/310; 411/451.1
(58) Field of Search ................................ 411/178, 180, 411/308–310, 411, 417, 418, 451.1, 453

(56) References Cited

U.S. PATENT DOCUMENTS

| | | | | |
|---|---|---|---|---|
| 1,088,892 A | * | 3/1914 | Foreman | |
| 1,465,148 A | * | 8/1923 | Rosenberg | |
| 2,321,378 A | * | 6/1943 | Green | |
| 3,092,162 A | * | 6/1963 | Johnsen | |
| 3,249,141 A | * | 5/1966 | Neuschotz | |
| 3,568,230 A | * | 3/1971 | Rosan | |
| 3,972,359 A | * | 8/1976 | Thomas | |
| 4,161,132 A | * | 7/1979 | Eklund | |
| 4,818,165 A | * | 4/1989 | Shirai | |
| 4,900,208 A | * | 2/1990 | Kaiser | |

FOREIGN PATENT DOCUMENTS

CH 242889 * 11/1946

* cited by examiner

*Primary Examiner*—Flemming Saether
(74) *Attorney, Agent, or Firm*—Alan D. Kamrath; Rider Bennett, LLP (57) ABSTRACT

A fastener includes a main body having a number of spaced ridges formed on an outer periphery thereof. The ridges are arranged along a helix. At least one of the ridges has a retainer extending in a direction that is at an angle with an extending direction of the ridge. In another embodiment, a fastener includes a main body having a number of spaced ridges formed on an outer periphery thereof. Each ridge extends along a direction that is parallel to a longitudinal direction of the main body. At least one of the ridges has a retainer extending in a direction that is at an angle with an extending direction of the ridge.

22 Claims, 12 Drawing Sheets

FASTENERS WITH IMPROVED RETAINING EFFECT

BACKGROUND OF THE INVENTION

1. Field of the Invention

The present invention relates to fasteners with improved retaining effect in an object in which they are mounted.

2. Description of the Related Art

Figure 1:
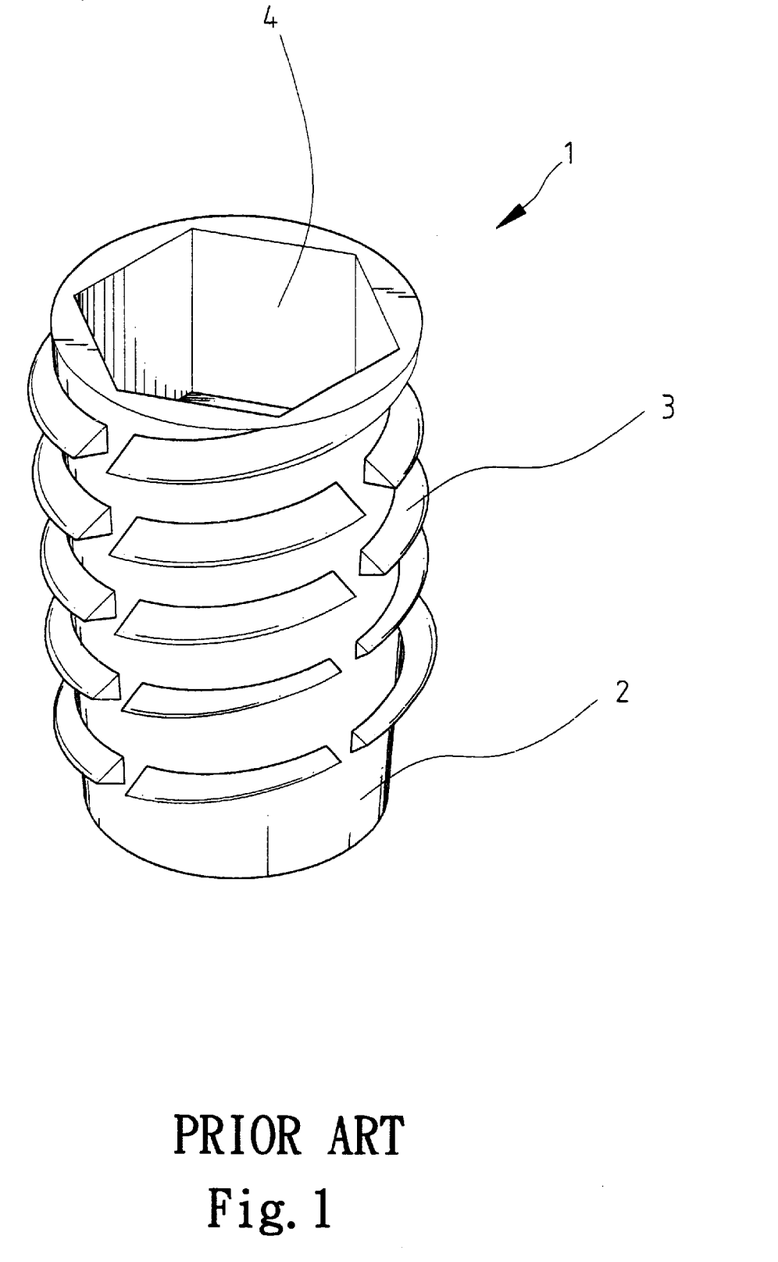
FIG. 1 is a perspective view of a conventional fastener for wood.

FIG. 1 of the drawings illustrates a conventional fastener for wood. The fastener 1 includes a plurality of spaced ridges 3 on an outer periphery of a main body 2 thereof, the ridges 3 being arranged along a helix. In use, the fastener 1 is screwed into a first piece of wood (not shown) and a bolt (not shown) is extended through a second piece of wood (not shown) and then through a groove 4 in an upper part of the fastener 1 and engaged with a screw hole (not shown) in a lower part of the fastener 1, thereby securely engaging the two pieces of woods together. It was, however, found that the fastener 1 tends to be disengaged from the first piece of wood along the engaging passage when the fastener 1 is turned or subjected to a force. As a result, the fastener could not provide the required retaining function.

SUMMARY OF THE INVENTION

It is the primary object of the present invention to provide fasteners with improved retaining effect in an object in which they are mounted.

In accordance with a first aspect of the invention, a fastener comprises a body, a plurality of spaced ridges arranged along a helix on the body, and at least one retainer formed on the body after one of the ridges. The at least one retainer extends at a greater pitch than the ridges do.

In accordance with a second aspect of the invention, a fastener comprises a main body having a plurality of spaced ridges formed on an outer periphery thereof. Each ridge extends along a direction that is parallel to a longitudinal direction of the main body. At least one of the ridges has a retainer extending in a direction that is at an angle with an extending direction of the ridge.

The retainer is at an acute angle with the ridge. The main body of the fastener includes a first end with a hexagonal groove defined therein. The main body of the fastener further includes a second end having a screw hole that is communicated with the hexagonal groove. The main body of the fastener may include an enlarged end to prevent excessive screwing of the fastener into wood. In an alternative embodiment, the fastener includes an end having a cruciform groove for engageing with a screwdriver. In another embodiment, the main body at the fastener tapers from the first end thereof toward the second end thereof. The helix may include an inclined screw-thread angle to assist in screwing of the fastener into the wood. The ridge is crescent and includes a lower first end and an upper second end. The retainer projects from the upper second end of the ridge and extends upward alone the direction that is at an angle with the extending direction of the ridge. In a further embodiment, the retainer is separated from the ridge.

Other objects, advantages, and novel features of the invention will become more apparent from the following detailed description when taken in conjunction with the accompanying drawings.

DETAILED DESCRIPTION OF THE PREFERRED EMBODIMENTS

Figure 2:
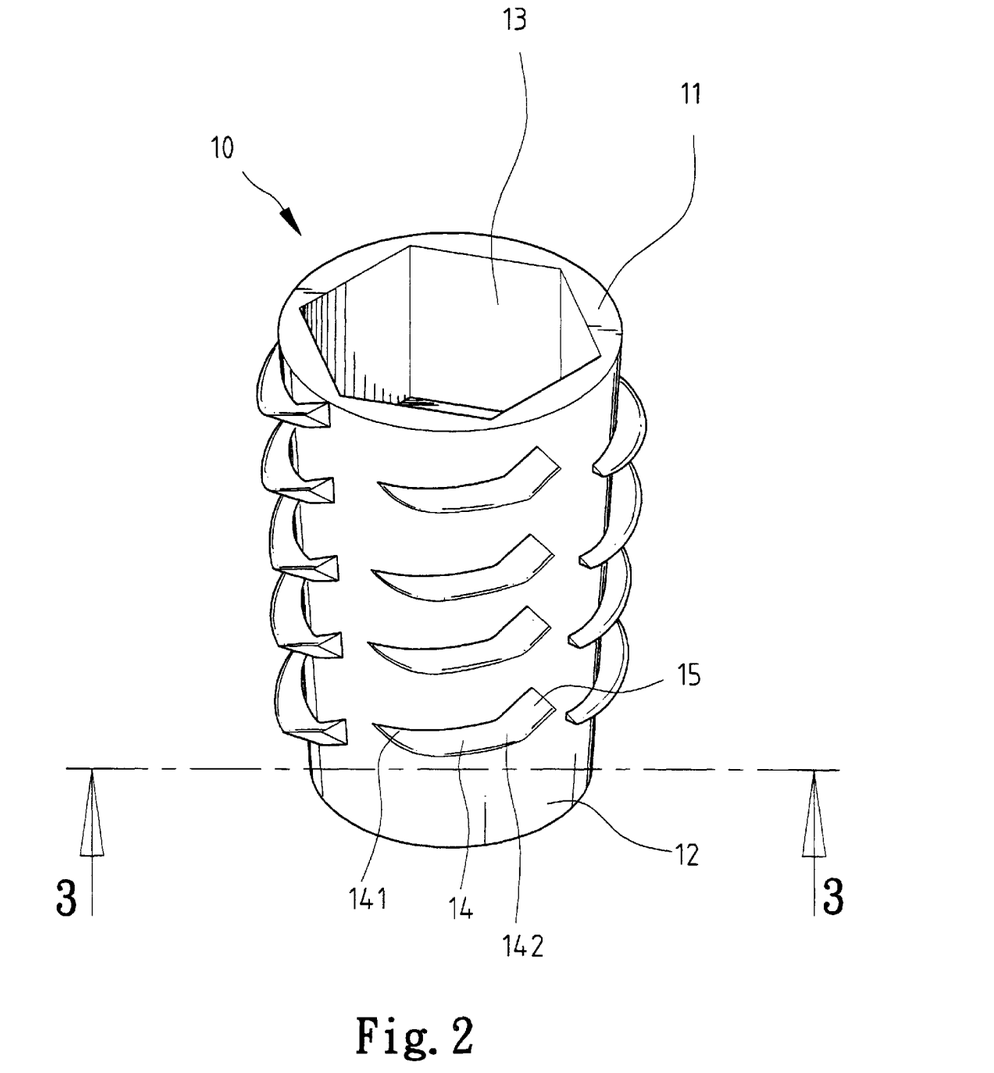
FIG. 2 is a perspective view of a fastener for wood in accordance with the present invention.
Figure 3:
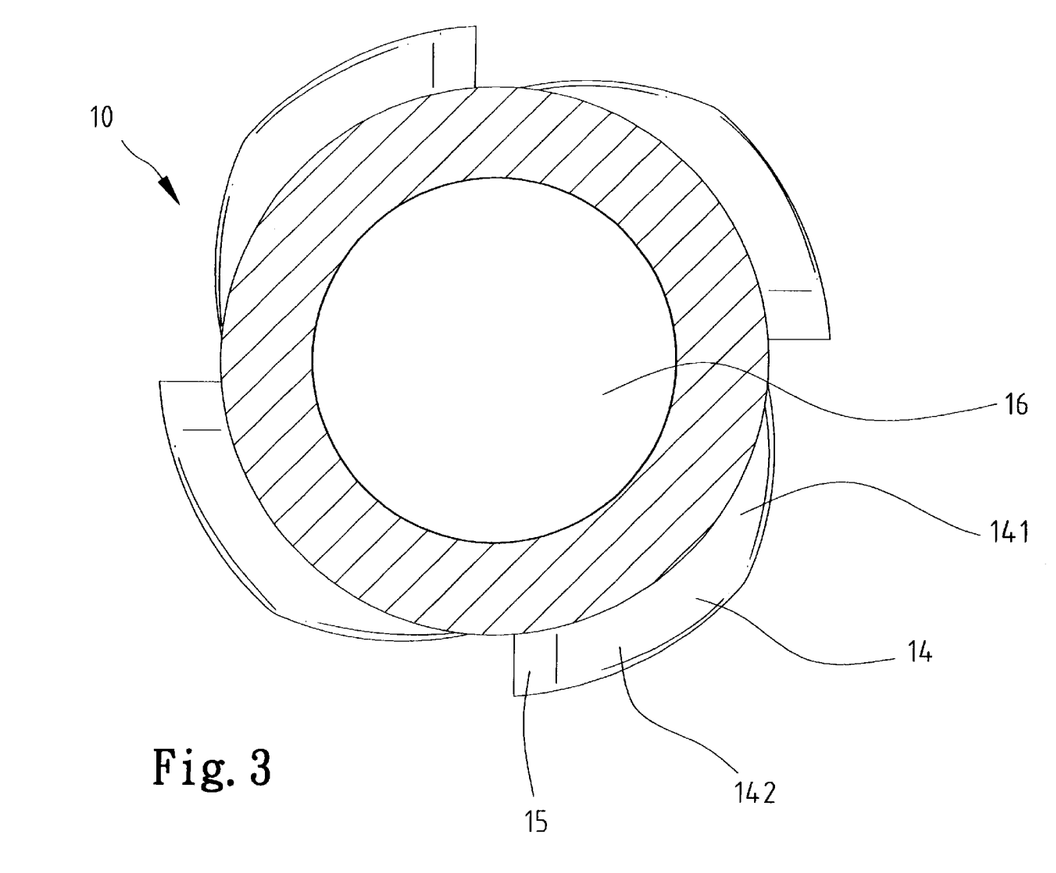
FIG. 3 is a sectional view taken along line 3—3 in FIG. 2.
Figure 6:
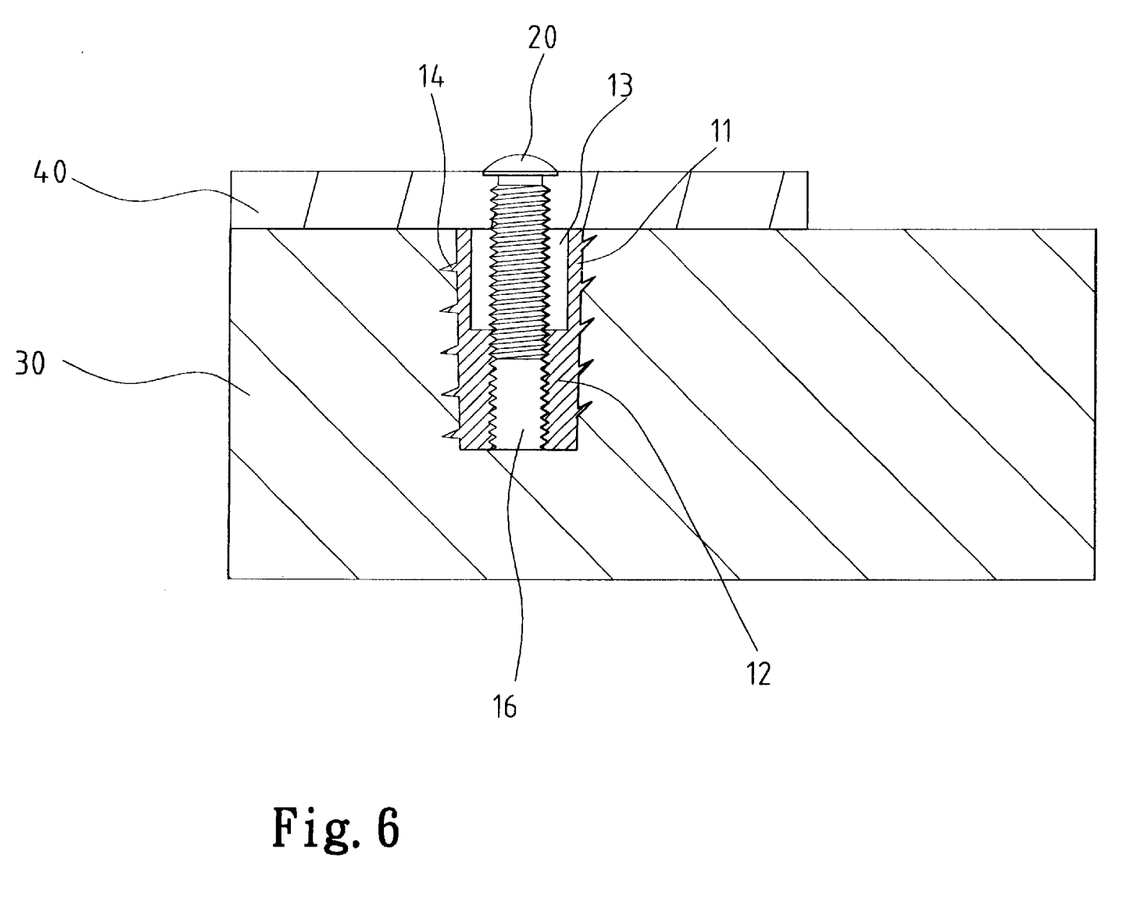
FIG. 6 is a schematic sectional view illustrating engagement between two pieces of wood by the fastener in accordance with the present invention and bolt.

Referring to FIGS. 2 through 12 and initially to FIGS. 2 and 3, a fastener for wood in accordance with the present invention is designated by "10" and generally includes a main body (not labeled) having a first end 11 and a second end 12. Preferably, the main body tapers from the first end 11 toward the second end 12. As illustrated in FIGS. 2, 3, and 6, the first end 11 of the main body includes a hexagonal groove 13 for engaging with a hex wrench and the second end 12 of the main body includes a screw hole 16 that communicates with the hexagonal groove 13. A plurality of spaced ridges 14 is formed on an outer periphery of the main body and arranged along a helix. Each ridge 14 is crescent and includes a lower first end 141 and an upper second end 142. In addition, a retainer 15 projects upward from the second end 142 of each ridge 14 and extends along a direction that is at an acute angle with an extending direction of the ridge 14.

Figure 4:
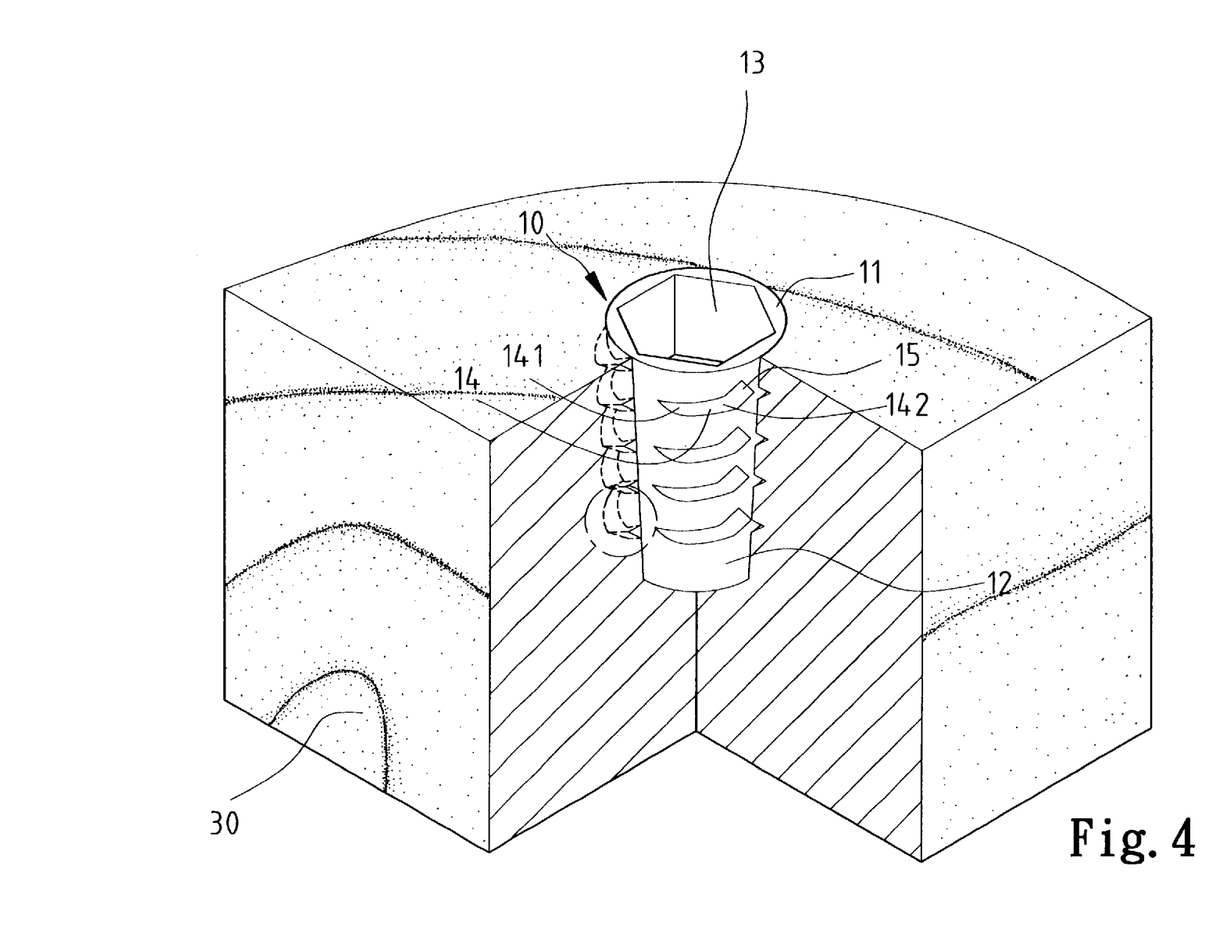
FIG. 4 is a perspective view, partly cutaway, illustrating engagement between the fastener in accordance with the present invention and wood.
Figure 5:
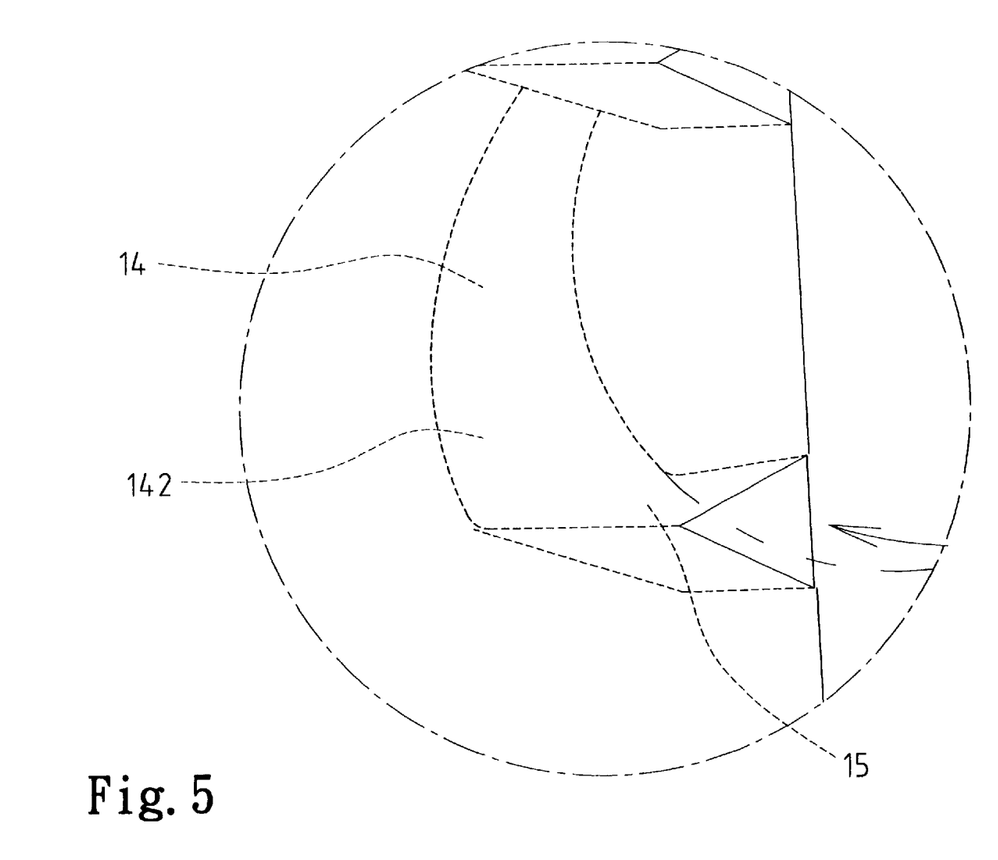
FIG. 5 is art enlarged view of a circle in FIG. 4.

Referring to FIGS. 4 and 5, the fastener 10 in accordance with the present invention can be screwed into wood by means of using a hex wrench that engages with the hexagonal groove 13 of the fastener 10. Since each ridge 14 is cresent and the retainer 15 on each ridge 14 forms a stop for preventing disengagedment of the fastener 10 from the wood 30, the fastener 30 can only be screwed into the wood and reverse operation is not allowed. Thus, the fastener 10 is retained in the wood. It is noted that the first end 11 of the main body may be enlarged to avoid excessive screwing of the fastener into the wood 30. In addition, the helix along which the ridges are arranged may have an inclined screw-thread angle to assist in screwing of the fastener 10 into the wood 30.

Referring to FIG. 6, a bolt 20 is extended through another piece of wood 40 and then through the hexagonal groove 13 and engaged with the screw hole 16 of the fastener 10. Thus, the two pieces of wood 30 and 40 are engaged with each other without the risk of disengagement.

Figure 7:
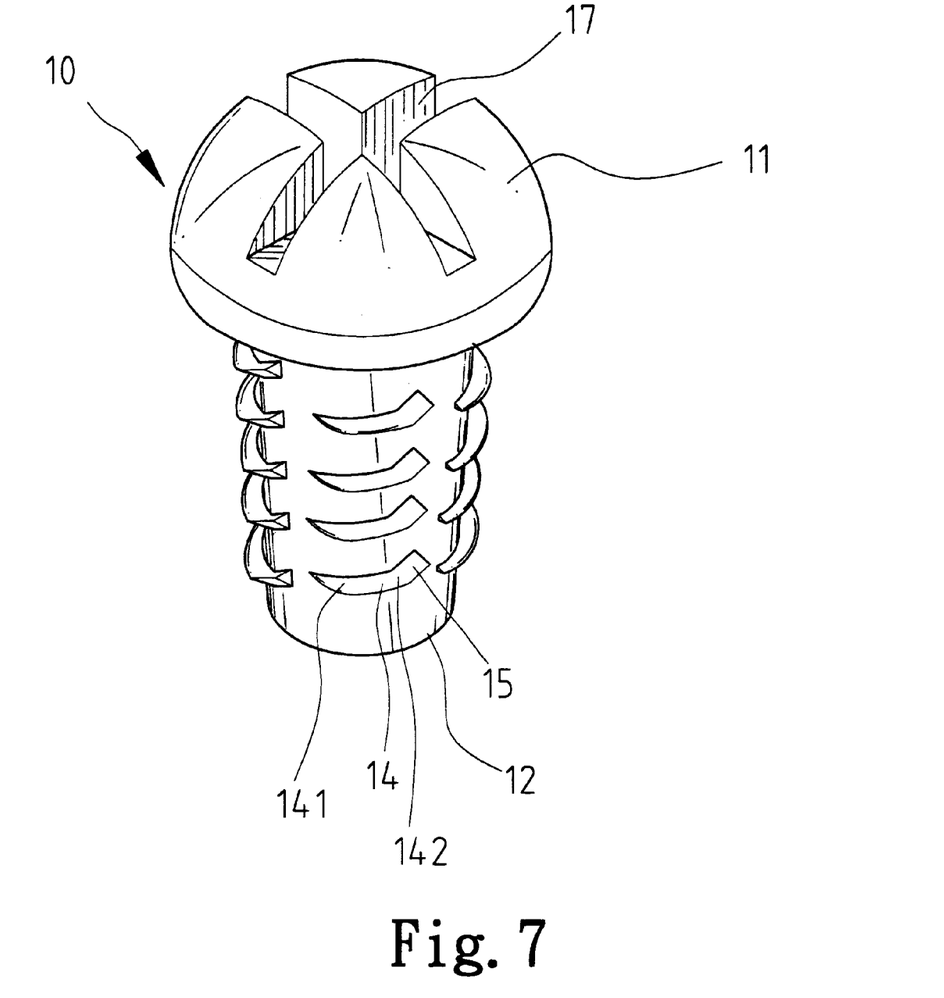
FIG. 7 is a perspective view illustrating a modified embodiment of the fastener in accordance with the present invention.
Figure 12:
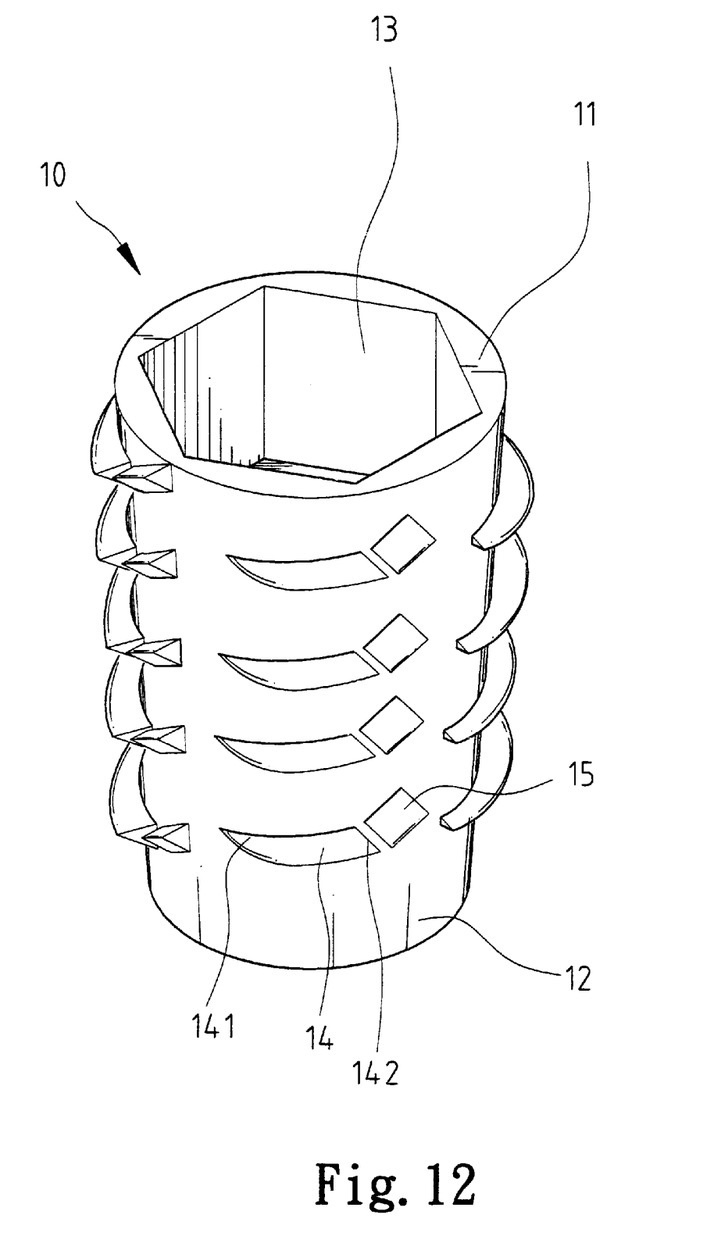
FIG. 12 is a further modified embodiment of the fastener in accordance with the present invention.

FIG. 7 illustrates a modified embodiment, wherein the first end 11 of the main body of the fastener 10 is an enlarged head with a cruciform groove 17 for engaging with a screwdriver. FIG. 12 illustrates another modified embodiment of the fastener that is modified from the fastener in FIG. 2, wherein each retainer 15 is separate from the second end 142 of an associated ridge 14.

Figure 8:
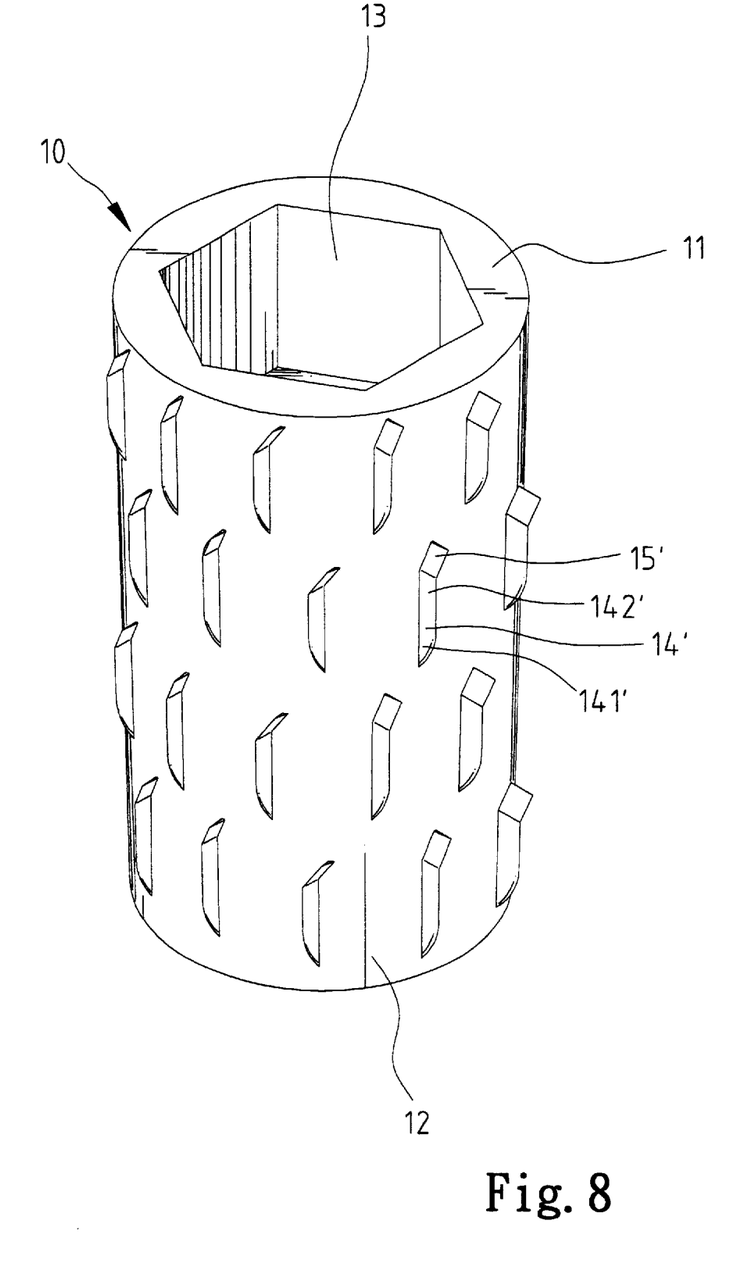
FIG. 8 is a perspective view of another modified embodiment of the fastener in accordance with the present invention.
Figure 9:
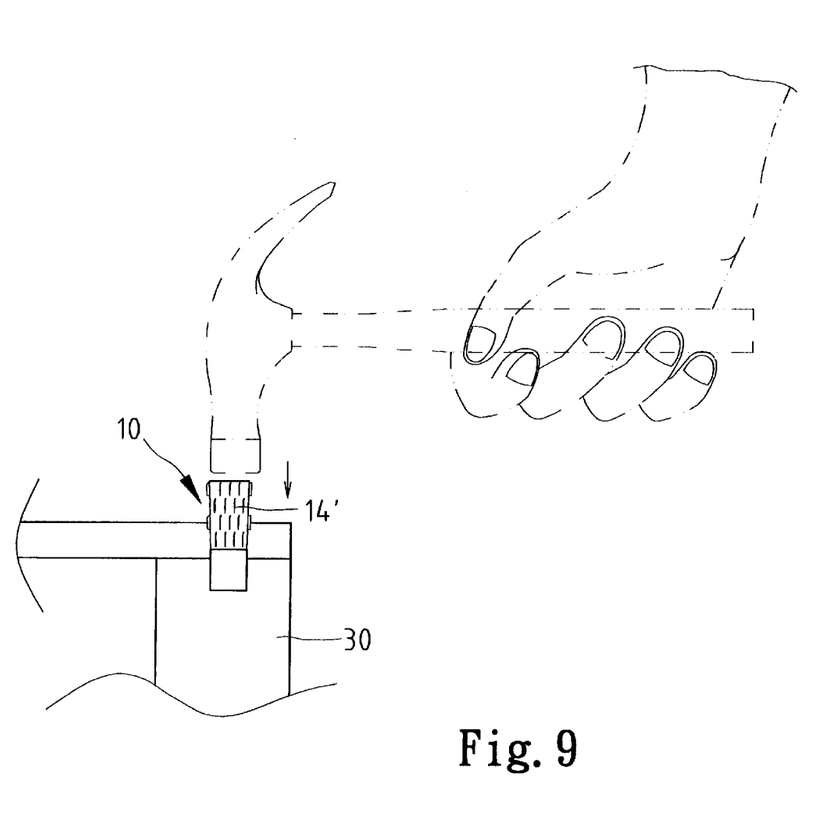
FIG. 9 is a schematic perspective view illustrating use of the fastener in FIG. 8.
Figure 10:
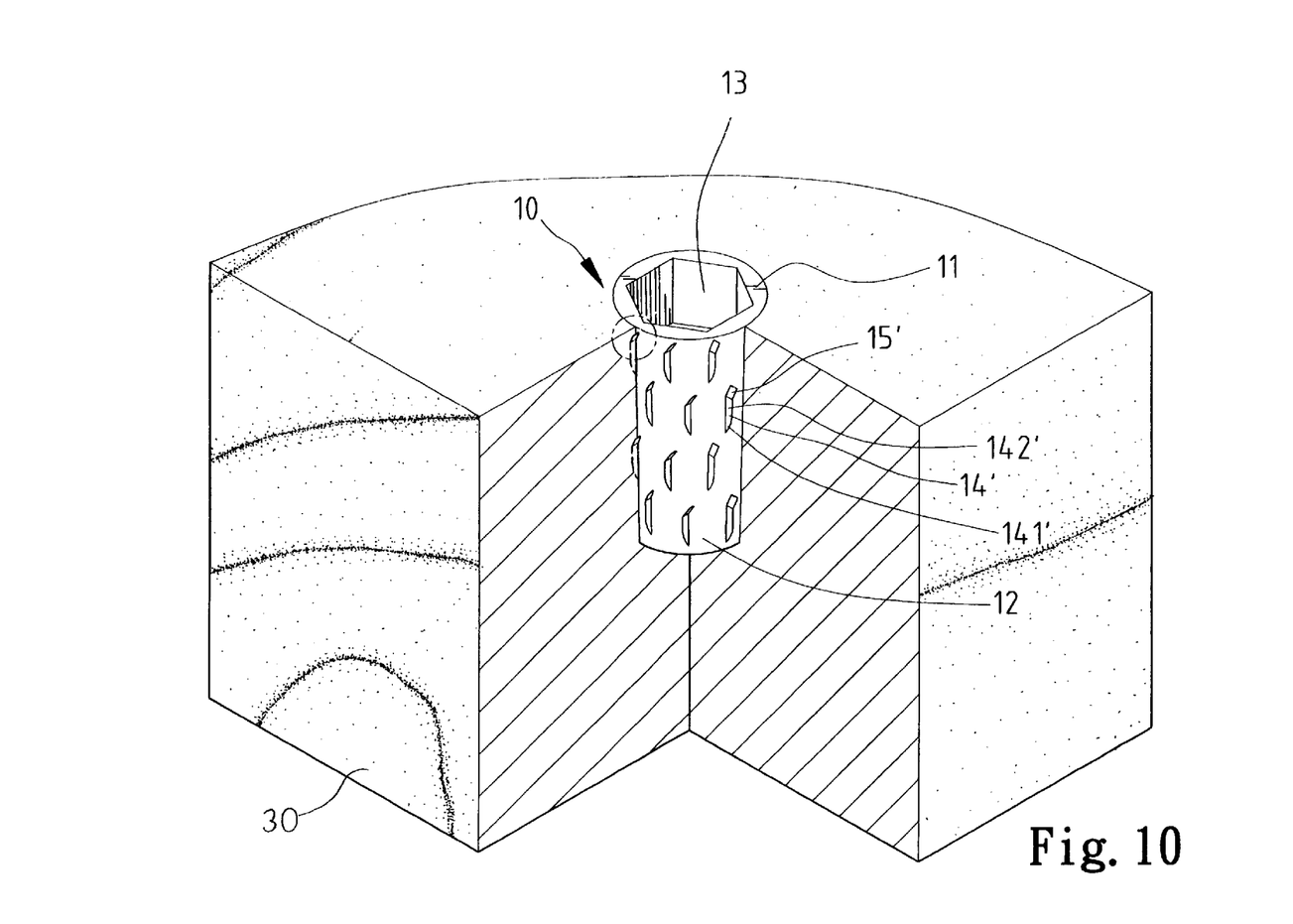
FIG. 10 is a perspective view, partly cutaway, illustrating engagement between the fastener in FIG. 8 and a wood.
Figure 11:
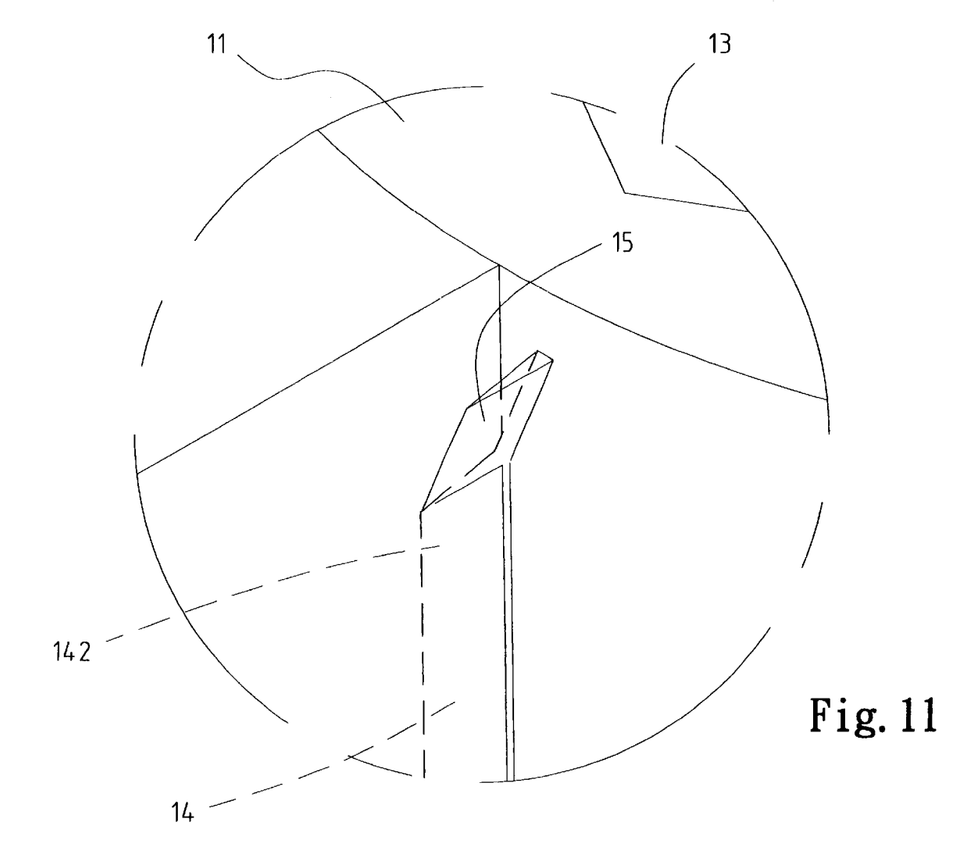
FIG. 11 is an enlarged view of a circle in FIG. 10.

FIG. 8 illustrates a further embodiment of the fastener that is modified from the first embodiment. wherein the fastener 10 in this embodiment is substantially identical to the fastener in FIG. 2 except for the ridges 14. In this embodiment a plurality of spaced ridges 14' is provided on the outer periphery of the main body of the fastener 10. Each ridge 14' extends along a direction parallel to a longitudinal direction of the main body of the fastener. Each ridge 14' includes a lower first end 141' and an upper second end 142'. A retainer 15' extends from the second end 142' of each ridge 14' and extends along a direction that is at an acute angle with the extending direction of the ridge 14'. In use, the fastener 10 is hammered into wood 30, as shown in FIG 9. It is noted that the retainer 15' of each ridge 14' prevents removal of the fastener 10 from the wood 30, as can be seen from FIGS. 10 and 11.

Although the invention has been explained in relation to its preferred embodiment, it is to be understood that many other possible modifications and variations can be made without departing from the scope of the invention as hereinafter claimed.

What is claimed is:

1. A fastener comprising:
   a body having a first end, a second end, and a generally cylindrical outer periphery extending between the first and second ends, with the generally cylindrical outer periphery defining an axis extending between the first and second ends, with the second end being the insertion end;
   a plurality of spaced ridges arranged on the generally cylindrical outer periphery of the body extending in a common direction, with each of the plurality of spaced ridges having a leading end towards the second end of the body and a trailing end towards the first end of the body;
   at least a first retainer formed on the generally cylindrical outer periphery of the body as an extension projecting from the trailing end of one of the plurality of spaced ridges in a direction inflected from said common direction; and
   at least a second retainer formed on the generally cylindrical outer periphery of the body as an extension projecting from the trailing end of another of the plurality of spaced ridges in a direction inflected from said common direction, with the at least first retainer and second retainer located intermediate the first and second ends of the body at axially offset locations.

2. The fastener as claimed in claim 1, wherein the first end of the body includes a hexagonal groove defined therein and the second end of the body has a screw hole that is communicated with the hexagonal groove.

3. The fastener as claimed in claim 1, wherein the first end of the body includes an enlarged end.

4. The fastener as claimed in claim 1, with the first end of the body having a cruciform groove.

5. The fastener as claimed in claim 1, with the first end tapering toward the second end.

6. The fastener as claimed in claim 5, wherein the first end of the body includes a hexagonal groove defined therein, the second end of the body having a screw hole that is communicated with the hexagonal groove.

7. The fastener as claimed in claim 1, wherein the plurality of spaced ridges are arranged in the common direction along a helix including an inclined screw-thread angle, with the at least first retainer and second retainer projecting at an acute angle with the common direction and extending toward the first end of the body.

8. The fastener as claimed in claim 1, wherein said one of the plurality of ridges forms a cresent.

9. The fastener as claimed in claim 8, wherein the at least first retainer projects upward from the common direction of said one of the plurality of spaced ridges.

10. The fastener as claimed in claim 1, with the plurality of spaced ridges being linearly straight with the leading ends and the trailing ends of each ridge located in planes including the axis.

11. The fastener as claimed in claim 10, wherein the at least first retainer projects at an acute angle with the common direction of said one of the plurality of spaced ridges.

12. The fastener as claimed in claim 10, wherein the first end of the body includes a hexagonal groove defined therein and the second end of the body has a screw hole that is communicated with the hexagonal groove.

13. The fastener as claimed in claim 10, wherein the first end of the body includes an enlarged end.

14. The fastener as claimed in claim 10, with the first end of the body having a cruciform groove.

15. The fastener as claimed in claim 10, with the first end tapering towards the second end.

16. The fastener as claimed in claim 15, wherein the first end of the body includes a hexagonal groove defined therein, the second end of the body having a screw hole that is communicated with the hexagonal groove.

17. The fastener as claimed in claim 10, wherein the at least first retainer is separate from said one of the plurality of spaced ridges.

18. The fastener as claimed in claim 10, wherein said one of the plurality of spaced ridges forms a crescent.

19. The fastener as claimed in claim 18, wherein the at least first retainer projects upward from the common direction of said one of the plurality of spaced ridges.

20. The fastener as claimed in claim 1, wherein the at least first retainer projects at an acute angle with the common direction of said one of the plurality of spaced ridges.

21. A fastener comprising:
   a body having a first end, a second end, and a generally cylindrical outer periphery extending between the first and second ends, with the generally cylindrical outer periphery defining an axis extending between the first and second ends, with the second end being the insertion end;
   a plurality of spaced ridges arranged in a helix on the generally cylindrical outer periphery of the body, with each of the plurality of spaced ridges having a leading end towards the second end of the body and a trailing end towards the first end of the body; and
   at least one retainer formed on the generally cylindrical outer periphery of the body as an extension projecting from the trailing end of one of the plurality of spaced ridges, with the retainer extending in a direction inflected from the helix of the plurality of spaced ridges and towards the first end of the body, to prevent disengagement of the fastener after placement.

22. The fastener as claimed in claim 21, wherein the retainer extends at an acute angle from the helix of the plurality of spaced ridges.

\* \* \* \* \*